Sept. 6, 1955  D. S. ROWE  2,716,886
MEASUREMENT OF COLLOID OSMOTIC PRESSURE
Filed Sept. 17, 1954  3 Sheets-Sheet 1

INVENTOR:
DAVID S. ROWE
By Stevens, Davis, Miller + Mosher
Attorneys

Sept. 6, 1955  D. S. ROWE  2,716,886
MEASUREMENT OF COLLOID OSMOTIC PRESSURE
Filed Sept. 17, 1954  3 Sheets-Sheet 2

INVENTOR:
DAVID S. ROWE

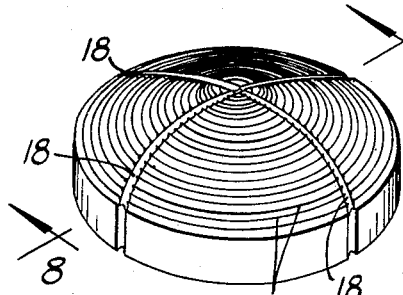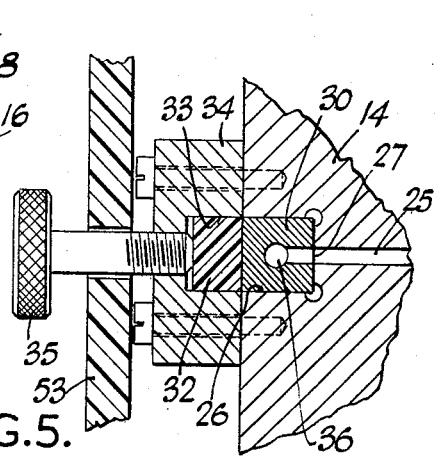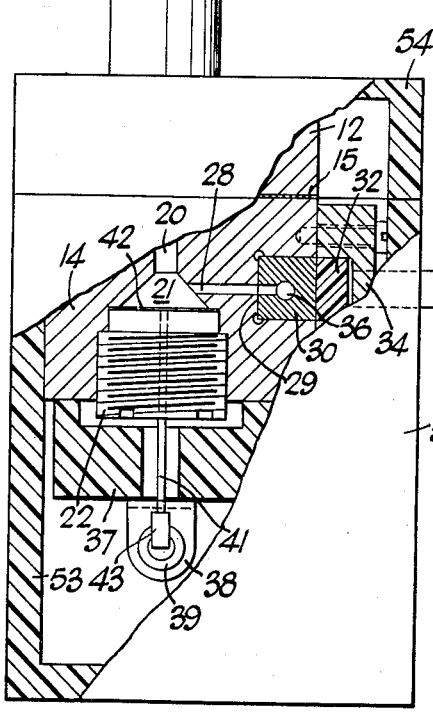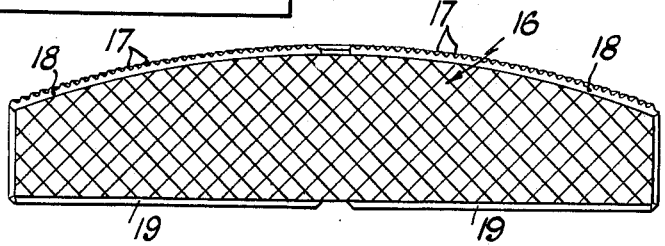

United States Patent Office 2,716,886
Patented Sept. 6, 1955

2,716,886

MEASUREMENT OF COLLOID OSMOTIC PRESSURE

David Stuart Rowe, Knowle, England, assignor to National Research Development Corporation, London, England, a British corporation Application September 17, 1954, Serial No. 456,743

Claims priority, application Great Britain September 24, 1953

10 Claims. (Cl. 73—53)

This invention relates to the measurement of the osmotic pressure of aqueous colloidal solutions. Osmotic pressure may be measured by an osmometer as the equivalent of the hydro-static pressure which must be applied to the colloidal solution to prevent transfer of solvent across a membrane, known as a semi-permeable membrane, which has the property of permitting the solvent but not the solute to pass through it.

An object of the present invention is to provide an instrument by means of which osmotic pressure can be measured quickly and conveniently and with considerable accuracy.

According to the present invention an osmometer comprises two spaced upright tubular columns, one for containing the colloidal solution being adapted to be connected at its open upper end to a source of pressure and pressure indicating means and at its lower end being open to one side of a semi-permeable membrane, the other tubular column for containing solvent being open to ambient pressure at its upper end and, being connected through a tap to a compartment closed by a diaphragm and exposed to the side of the membrane opposite to the column for the colloidal solution, and the diaphragm being connected to a sensitive means for detecting small deflections.

When colloidal solution and solvent are put into their respective columns and pressure is applied to the colloidal solution from the source of pressure, if the tap is then closed excess flow of solvent in one direction over that in the opposite direction across the membrane will result in a change of volume of solvent in the diaphragm compartment and in deflection of the diaphragm. The osmotic pressure of the solution will be given by the pressure indicating means when the pressure applied to the colloidal solution is adjusted so that no change in the volume of the diaphragm compartment occurs on closing the tap.

The accuracy of the measurement made by this osmometer can be improved by preferred features of construction of the instrument and technique in its use now to be described, by way of example and with reference to the accompanying drawings in which Figure 1 is a perspective view of an osmometer according to the present invention with thermal insulation removed.

Figure 4 is a sectional end view on line 4—4 of Figure 3.

Figure 5 is a fragmentary sectional end view on line 5—5 of Figure 3.

Figures 6 and 7 are respectively upper and underside perspective views of a membrane support.

Figure 8 is a sectional view on line 8—8 of Figure 6.

Figure 1:
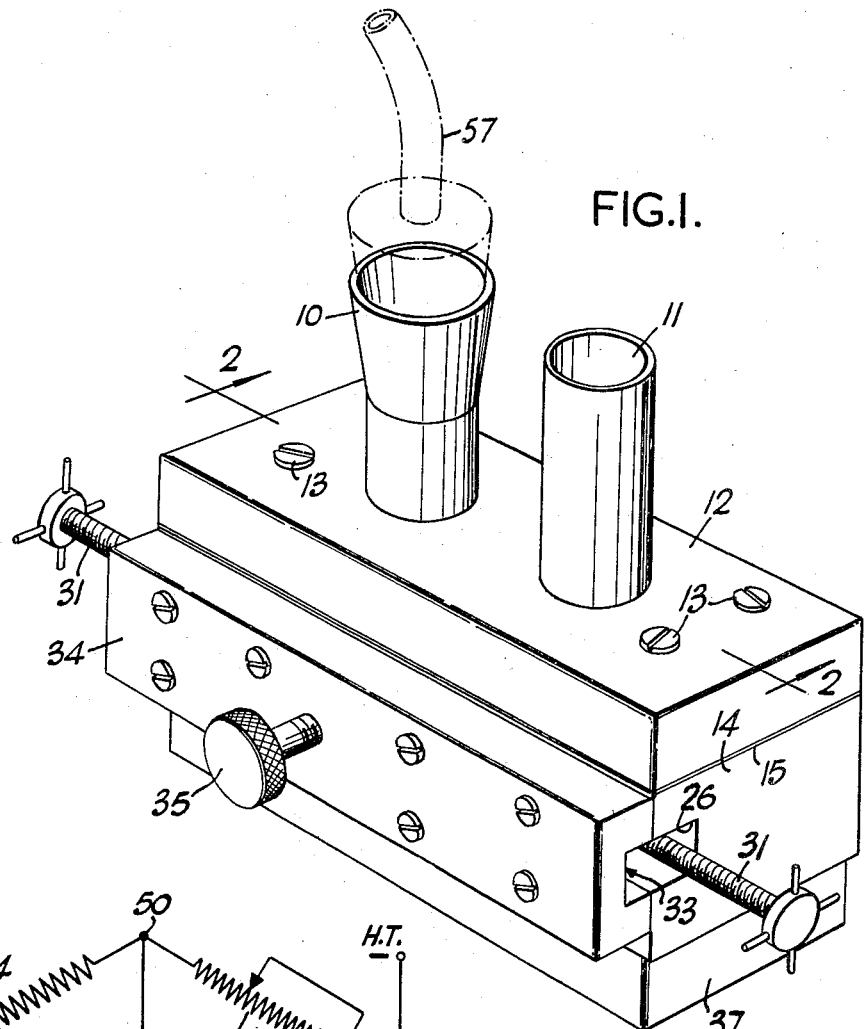

A glass tubular column 10 for colloidal solution and one 11 for solvent are sealed into and project from a substantial stainless steel cover 12 which is rigidly but releasably secured, for example, by screws 13 to a substantial body block 14 also of stainless steel.

Between the confronting surfaces of the cover 12 and block 14 a semi-permeable membrane 15 is clamped. The bores of the tubular columns 10 and 11 are continued through the cover 12 to expose the semi-permeable membrane. In the body 14 and under the opening of the "solution" column 10 in the cover 12 is a shallow cavity to receive a circular domed membrane support 16 of stainless steel.

In one example the bore of each of the glass tubes 10 and 11 is 1.7 centimetres diameter and the membrane support is 1.6 centimetres diameter so that it occupies substantially the whole of the area of the opening to the solution column 10. A height of 1.4 millimetres for the crown of the membrane support above the periphery has been found satisfactory in this example for membranes of nitro-cellulose. The domed support prevents "flap" of the membrane at low pressures and bursting at high pressures. Too high a dome affects the membrane's semi-permeability. The domed surface of the membrane support is formed with closely spaced ribs to expose a large area of the membrane to channels or grooves 17 between the ribs (see Figures 6 to 8). These channels or grooves 17 are joined by intersecting diametral grooves 18 continued across the peripheral edge to meet intersecting diametral grooves 19 on the underface of the membrane support. A passage 20 in the body block 14 is co-axial at the upper end with and opens into the cavity for the membrane support and is therefore in communication with the grooves 17 through the grooves 18 and 19. At the lower end the bore 20 opens into the truncated end of a truncated conical space forming a diaphragm compartment 21.

The mouth of the diaphragm compartment 21 is closed by a diaphragm 42 of brass foil which in the example mentioned is .002 inch (approximately .05 millimetre) thick. The brass foil is rhodium plated and held in place by a screw-threaded phosphor bronze bush 22 screwed into a tapped bore in the body block 14.

Below the "solvent" column 11 a passage 23 co-axial with the bore of the "solvent" column tube passes through the body block 14. Its upper end is open to the bore of the "solvent" column through a hole punched in the membrane 15 and its lower end is closed by a removable plug 56. This can be taken out for cleaning the passage 23 into which foreign matter may fall from the "solvent" column 11. Immediately above the upper end of the plug 56 a longitudinal passage 24 leads to a lateral passage 25 which extends through the wall of a channel shaped valve slideway 26 to form a valve port 27. A passage 28 parallel to the passage 25 extends from the diaphragm compartment 21 to the valve slideway 26 to form a second valve port 29.

The valve slideway 26 extends along the whole length of the side face of the body block 14 and in it is slidably fitted a slide valve 30 which is made of stainless steel, ground and lapped to fit the slideway 26 closely, especially on the face which closes the ports 27 and 29, yet is able to be pushed freely along the slideway 26 by one or other of a pair of traversing screws 31. These screws 31 are pointed to engage the flat end faces of the slide valve 30 and move it along the slideway while avoiding any tendency to lift it from its seating. The corners of the valve slideway are undercut or relieved as shown in Figure 5 to provide clearance for the edges of the slide valve. To hold the slide valve on its seating a pressure bar 32 of laminated plastic is provided in a groove 33 on the inner face of a valve cover 34 secured by screws to the body block 14. The pressure bar 32 can be moved towards or away from the slide valve 30 to vary the pressure with which it bears on the slide valve and the slide valve on its seating by a pressure adjusting screw 35 located in the valve cover 34 at a point midway between the ports 27 and 29.

To put the ports 27 and 29 into communication with one another and so open the contents of the "solvent" column 11 to the underside of the semi-permeable membrane at the membrane support 16 a passage 36 is formed within the slide valve 30 the ends of which, opening through its seating face, are spaced the same distance apart as the ports 27 and 29. When the slide valve is moved therefore to bring the ends of the passage 36 into registration with the ports 27 and 29 the latter are put into communication with one another as required. This valve construction has a very sharp cut off on closing and closure of the valve can be effected with a pressure change in the diaphragm compartment of less than 0.2 millimetre of water.

To the face of the body block 14 opposite the junction face is bolted a sheet or block of laminated plastic 37 which supports a rigid mounting 38 for a mechano-electronic transducer valve 39 (Radio Corporation of America type number 5734). The plastic block 37 helps to insulate the body block 14 thermally from the transducer valve 39 which becomes warm in use.

The transducer valve 39 comprises an envelope fitted with a contact base at one end and closed at the other end by a diaphragm on which the anode of the valve is movably mounted. The anode is movable by a finger 40 to which the movement to be detected is applied. Minute deflections of the finger 40 cause a change in the anode to cathode resistance of the valve which can be readily detected by a sensitive galvanometer in a bridge circuit to be described later. The axis of the valve envelope is arranged parallel to the face of the body block 14. The finger 40 extends over the mouth of the bush 22 which clamps the diaphragm 42. A light but stiff rod 41 is secured rigidly to the centre of the diaphragm 42, passes through a hole in the plastic block 37 and is connected to the finger 40 by a short spring steel blade 43 which permits the necessary slight angular movement between the rod 41 and finger 40 occurring upon deflection of the diaphragm 42.

Figure 9:
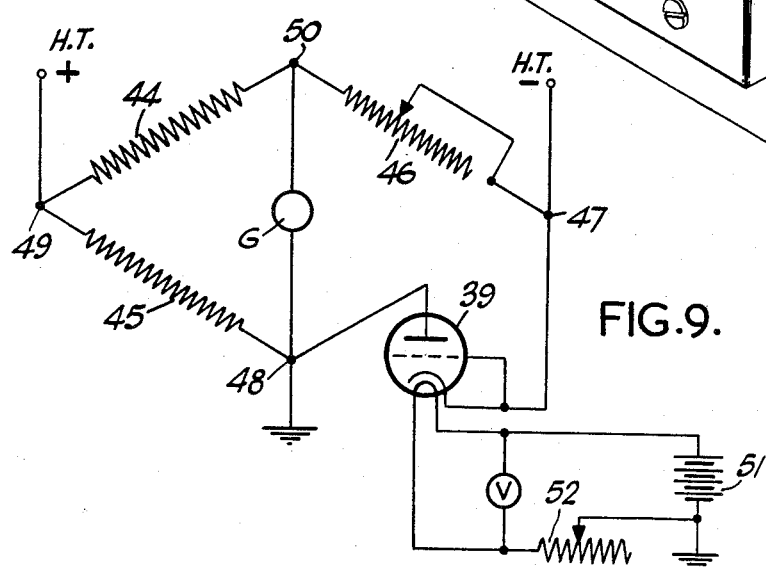
Figure 9 is a diagram of an electrical circuit used with the osmometer.
Figure 2:
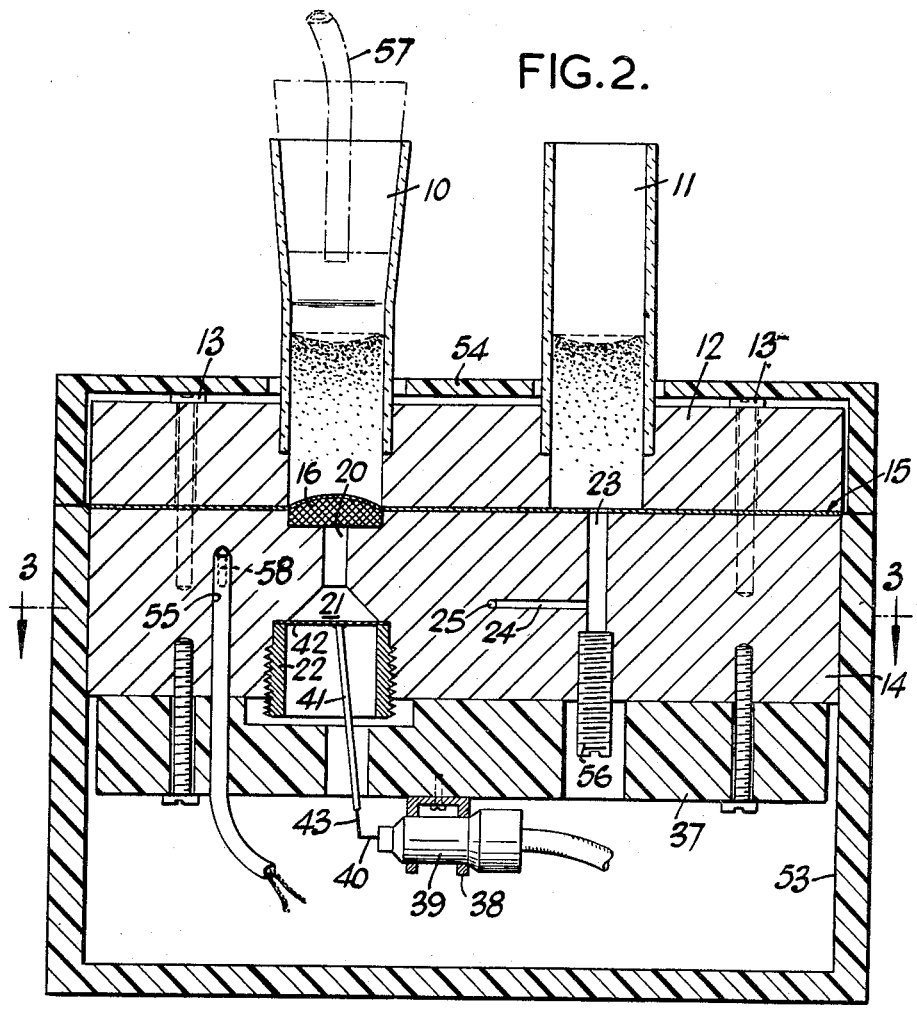
Figure 2 is a sectional elevation on line 2—2 of Figure 1.
Figure 3:
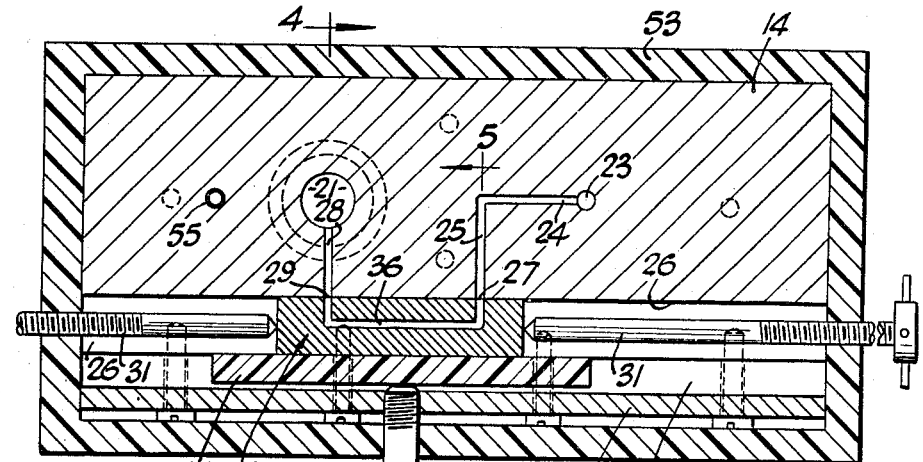
Figure 3 is a sectional plan on line 3—3 of Figure 2.

The anode and cathode of the transducer valve 39 are connected as one arm of the Wheatstone bridge circuit shown in Figure 9 of the accompanying drawings. The other arms comprise respectively fixed resistors 44 and 45 and a variable resistor 46 forming a balancing arm, which are connected together at junctions 47, 48, 49, 50. Junctions 49 and 47 are joined respectively to positive and negative of a high tension D. C. supply. Junctions 48 and 50 are joined through a sensitive galvanometer G and point 48 is grounded. The heater of the transducer valve is supplied from a source 51 through a variable resistor 52. A voltmeter V is provided to indicate the potential difference across the heater element which it is important to keep constant to ensure stability.

The osmometer is preferably supported on a stand (not shown) by studs or screws engaging the body block 14. Thermally to insulate the instrument a shield 53 of laminated plastic is fitted round the body block 14 and encloses the transducer valve 39. It also has tapped holes in which the traversing screws 31 are fitted. The shield 53 is secured to the body block 14 and the edge of the plastic block 37 is recessed to avoid contact with and possible disturbance by the shield 53 which might affect the accuracy of measurements made. An insulating cover 54 fits loosely over the cover plate 12 from which it can readily be lifted when required.

In the body block 14 a passage 55 is formed extending through the plastic block 37 to a point near the membrane support 16 for a thermocouple 58 for indicating the temperature of the contents of the "solution" column 10.

The "solution" column 10 may be connected to a source of pressure and a pressure indicating means (not shown) by a pipe 57 indicated in Figure 1 by chain dotted lines.

In setting up the instrument for use the diaphragm compartment 21 and the passages through the body block 14 are filled with solvent, for example, by means of a Pasteur pipette. The semi-permeable membrane 15 is then laid across the membrane support 16 and over the junction face of the body block 14. A hole is punched through the membrane at the mouth of the passage 23. The cover 12 is then placed in position and secured tightly to the body block 14. Initially solvent is put into the "solution" column 10. A volume of 2 millilitres is sufficient to provide a meniscus above the body block 14. Solvent is put into the "solvent" column 11 to the same level as the solvent in the "solution" column 10. In this way the hydro-static pressure on the membrane due to the height of the "solution" column is compensated. Since the columns are of similar bore any surface tension effects are also balanced, assuming that the surface tension of solution and solvent are similar.

A waiting period, which may vary considerably with the type of membrane in use, is allowed for equilibration. No change in galvanometer deflection should occur when the slide valve 30 is moved to close the port 29 if the osmometer is in equilibrium.

The solvent is then removed from the "solution" column and replaced to the same level with colloidal solution at the same temperature as the fluid in the "solution" column as measured by the thermocouple 58. The pressure pipe 57 is connected to the upper end of the "solution" column 10.

The measurement of the osmotic pressure may be made by a "null" method in which the pressure on the "solution" column 10 is adjusted until, after moving the slide valve 30 to close the port 29, no change of deflection of the galvanometer G occurs. The large thermal capacity of the body block 14 helps to maintain constant temperature during the actual measurement. For even more accurate measurement the body block may be immersed in a water bath the temperature of which is thermo-statically controlled. When the valve is closed before pressure equilibrium is reached transfer of solvent across the membrane will cause a gradual increase or reduction in the volume of the solvent to be contained in the diaphragm compartment 21. An appropriate progressive deflection of the diaphragm 42 will take place causing the indication of the galvanometer to creep in one direction for increasing volume and in the opposite direction for diminishing volume. The valve is re-opened, the pressure decreased or increased appropriately and a further test made. The procedure is repeated until no movement can be detected. The pressure applied is then equal to the osmotic pressure of the solution.

An alternative method of estimating the colloid osmotic pressure is to estimate the change of pressure in the diaphragm compartment for a given pressure and a given time of closure of the top by obtaining the difference between the galvanometer deflections immediately before and after re-opening the valve at the end of the given time of closure of the tap. If this be done for a series of pressures above and below the osmotic pressure and pressure plotted against difference in galvanometer deflections obtained as described above, a linear relationship between pressure and galvanometer deflection is obtained. The pressure at the point of no deflection, equivalent to the colloid osmotic pressure, can be obtained from the graph.

After determining the osmotic pressure of a solution it may be removed and replaced by other colloidal solutions, brought to the same temperature as described above.

Since the diaphragm compartment 21 and the passage associated with it when the valve is closed are contained within the very rigid stainless steel block the brass foil diaphragm 42 can detect transfer across the membrane with considerable sensitivity. The use of stainless steel avoids corrosion.

Instead of a valve transducer 39 a capacitor or transformer transducer may be used and may be housed within the bore of the phosphor bronze bush retaining the brass foil diaphragm.

This osmometer according to the present invention is simple and not costly to construct and enables osmotic pressure of colloid solutions to be measured quickly and conveniently and with considerable accuracy and more rapidly than with methods hitherto available. With suitable care an accuracy of pluse or minus 0.5 millimetre water may be obtained, using suitable semi-permeable membranes. Membranes found satisfactory are described by Wells in the American Journal of Physiology, 1932, volume 101, page 409.

I claim:

1. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a valve; a compartment within the body block closed by a diaphragm and open to the junction face of the body block opposite to the "solution" column for exposure to the other side of the membrane, there being a passage in the body block connecting the said diaphragm compartment to the valve and there being a further passage connecting the valve to the "solvent" column; sensitive means for detecting small deflections and means for affecting said sensitive detecting means by deflections of said diaphragm.

2. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a valve; a compartment within the body block closed by a diaphragm and open to the junction face of the body block opposite to the solution column; a membrane support opposite to the solution column a surface of which support is domed and grooved to expose a large area of the surface of the membrane in contact with it to the diaphragm compartment, the domed surface protruding above the junction face of the body block, there being a passage in the body block connecting the said diaphragm compartment to the valve and there being a further passage connecting the valve to the "solvent" column; sensitive means for detecting small deflections and means for affecting said sensitive detecting means by deflections of said diaphragm.

3. An osmometer according to claim 2 wherein the membrane support is a removably insert in a cavity in the junction face of the body block.

4. An osmometer according to claim 3 wherein the grooves formed between the ribs are joined by intersecting diametral grooves continuing over the peripheral edge of the membrane support to join diametral grooves in the underface of the membrane support which intersect at the opening of a bore leading from the cavity to the diaphragm compartment.

5. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a compartment within the body block closed by a diaphragm and open to the junction face of the body block opposite to the "solution" column for exposure to the other side of the membrane; there being two ducts within the body block open respectively to the diaphragm compartment and the solvent column and leading to and forming ports in a valve seating; a slide valve slidably mounted with respect to the seating and having a through passage adapted to put the ports into communication with one another in one position of the slide valve from which it is slidably displaceable to disconnect and seal the ports; sensitive means for detecting small deflections and means for connecting said diaphragm to said sensitive detecting means to be responsive to deflections of said diaphragm.

6. An osmometer according to claim 5, wherein the slide valve is mounted in a channel-shaped slideway formed in the body block the base of which slideway forms the valve seating and further comprising a pressure bar holding the slide valve against its seating and adjustable with respect to the slide valve to vary the pressure with which it bears on the slide valve and the slide valve bears on its seating.

7. An osmometer according to claim 6 and further comprising traversing means having pointed portions adapted to bear on end faces of the slide valve which are at right angles to the direction of travel of the slide valve to move it by pushing action while avoiding any tendency to lift it from its seating.

8. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a valve; a truncated conical compartment within the body block closed at the large diameter end by a thin diaphragm and open at the truncated end to the junction face of the body block opposite to the solution column; a membrane support opposite to the solution column a surface of which support is domed and grooved to expose a large area of the surface of the membrane in contact with it to the diaphragm compartment, the domed surface protruding above the junction face of the body block, there being a passage in the body block connecting the said diaphragm compartment to the valve and there being a further passage connecting the valve to the "solvent" column; sensitive means for detecting small deflections and means for affecting said sensitive detecting means by deflections of said diaphragm.

9. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a valve; a compartment within the body block closed by a diaphragm and open to the junction face of the body block opposite to the "solution" column for exposure to the other side of the membrane, there being a passage in the body block connecting the said diaphragm compartment to the valve and there being a further passage connecting the valve to the "solvent" column; a mechano-electronic transducer valve rigidly mounted with respect to said block and having a movable anode, means for moving said movable anode responsive to deflections of said diaphragm.

10. An osmometer comprising rigid body and cover blocks rigidly but separably secured together and adapted to clamp between their junction faces a semi-permeable membrane; two spaced upright tubular columns mounted on the cover block, one of said tubes, for containing colloidal solution, being adapted to be connected at its open upper end to a source of pressure including pressure indicating means and at its lower end being open to the junction face of the cover for exposure to one side of the semi-permeable membrane, the other of said tubular columns, for containing solvent, being open to ambient pressure at its upper end; a compartment within the body block closed by a diaphragm and open to the junction face of the body block opposite to the "solution" column for exposure to the other side of the membrane; there being two ducts within the body block open respectively to the diaphragm compartment and the solvent column and leading to and forming ports in a valve seating; a slide valve slidably mounted with respect to the seating and having a through passage adapted to put the ports into communication with one another in one position of the slide valve from which it is slidably displaceable to disconnect and seal the ports; a mechano-electronic transducer valve rigidly mounted with respect to said block and having a movable anode, means for moving said movable anode responsive to deflections of said diaphragm.

References Cited in the file of this patent

FOREIGN PATENTS 669,342   Germany _____ Dec. 23, 1938

OTHER REFERENCES

National Bureau of Standards Technical News Bulletin, pp. 68 and 69, May 1953.